United States Patent [19]

Okita et al.

[11] Patent Number: 4,751,272
[45] Date of Patent: Jun. 14, 1988

[54] PROCESS FOR PRODUCING OXYMETHYLENE COPOLYMER AND RESINOUS COMPOSITION

[75] Inventors: Sigeru Okita, Nagoya; Yoshiyuki Yamamoto, Suzuka; Toshihiro Hatsu, Nagoya, all of Japan

[73] Assignee: Toray Industries, Inc., Tokyo, Japan

[21] Appl. No.: 43,144

[22] Filed: Apr. 27, 1987

[30] Foreign Application Priority Data

| May 1, 1986 [JP] | Japan | 61-101310 |
| Jul. 2, 1986 [JP] | Japan | 61-153986 |
| Sep. 5, 1986 [JP] | Japan | 61-207810 |
| Oct. 20, 1986 [JP] | Japan | 61-247381 |

[51] Int. Cl.$^4$ .............................................. C08G 2/28
[52] U.S. Cl. ..................................... 525/398; 525/405; 528/230; 528/269; 528/270
[58] Field of Search .............. 525/398, 405; 528/230, 528/269, 270

[56] References Cited

U.S. PATENT DOCUMENTS

| 2,920,059 | 1/1960 | MacDonald et al. | 528/230 |
| 3,524,832 | 8/1970 | Green | 528/230 |
| 3,626,024 | 12/1971 | Gutweiler et al. | 525/398 |
| 4,087,411 | 5/1978 | Sugio et al. | 525/398 |

Primary Examiner—Lucille M. Phynes
Attorney, Agent, or Firm—Austin R. Miller

[57] ABSTRACT

A process for producing an oxymethylene copolymer, comprising the steps of polymerizing trioxane and cyclic ether in the presence of a boron trifluoride catalyst, adding a hindered amine compound to the polymer obtained by said polymerization, and stabilizing instable chain ends of the polymer. The oxymethylene copolymer thus obtained provides excellent heat resistance and superior mechanical properties.

22 Claims, No Drawings

PROCESS FOR PRODUCING OXYMETHYLENE COPOLYMER AND RESINOUS COMPOSITION

BACKGROUND OF THE INVENTION

1. Field of the Invention

The present invention relates to a process for producing an oxymethylene copolymer excellent in heat resistance and mechanical properties. It also relates to an oxymethylene copolymer composition.

2. Description of the Prior Art

It has been known from, for example, Japanese patent Publication No. 14640/61 that oxymethylene copolymer is obtained by polymerizing trioxane and cyclic ether in the presence of a catalyst. Since the polymer thus obtained is thermally unstable, terminal sealing through esterification, or degradation and removal of unstable chain ends, is carried out for stabilization, before which, however, deactivation of the catalyst in order to inhibit further reaction is required. That is, polyoxymethylene derived from cationoid polymerization of trioxane or the like will slowly generate depolymerization, resulting in remarkably lowered molecular weight and/or extreme thermal instability, unless the catalyst remaining therein is deactivated.

As to deactivation of a boron trifluoride polymerization catalyst, U.S. Pat. No. 2,989,509 discloses the use of aliphatic amine or heterocyclic amine. By deactivating the catalyst with such amine followed by washing to remove them, the polymer is stabilized enough to avoid lowering the molecular weight when preserved as it is for a long period.

However, unless the catalyst is removed from the polymer by washing after it is deactivated by a general amine compound, depolymerization will still occur and the molecular weight will be lowered when the polymer is melted or dissolved. Accordingly, it has been essential to remove the catalyst from the polymer by a thorough washing operation after the catalyst is deactivated by normal amine. Japanese Patent Publication Nos. 8071/64 and 1875/68, for example, propose methods of stabilizing copolymer chain ends, in which cases also prior to starting the chain ends stabilizing process, a polymerization catalyst is deactivated by amine and then removed by washing. In order to produce an oxymethylene copolymer with higher thermal stability, however, it is essential to blend a stabilizer as well as to degrade the instable chain ends after deactivation of the catalyst. For this purpose, a variety of stabilizers have conventionally been known such as polyamide and hindered phenol to be milled for stabilization according to Japanese patent Publication No. 5440/59.

By milling such stabilizers as mentioned above, the thermal stability is surely increased, but not satisfactorily, because when the polymer is kept in the melted state for a long time in a molding process or the like, decomposition with foaming occurs and mold-deposits are generated. In addition, if washing to remove the catalyst is omitted in the process of catalyst deactivation by normal amine, thermal stability of the polymer will remain too low to withstand molding or the like, whichever stabilizer is milled.

SUMMARY OF THE INVENTION

An objective of this invention is to propose a very simple but effective method of halting the polymerization.

Another objective of this invention is to propose a process for producing an oxymethylene copolymer excellent in heat resistance. A further objective of this invention is to propose a process for producing an oxymethylene copolymer excellent in mechanical properties.

A still further objective of this invention is to provide a resinuous composition of oxymethylene copolymer excellent in both heat resistance and mechanical properties.

These objectives of this invention are achieved by polymerizing trioxane and cyclic ether in the presence of a boron trifluoride catalyst to produce a copolymer to which a special hindered amine compound is added for deactivation of the catalyst which is followed by stabilization of the instable chain ends of the copolymer.

DETAILED DESCRIPTION OF THE PREFERRED EMBODIMENTS

A cyclic ether employed in this invention represents a compound expressed by the following general formula (A):

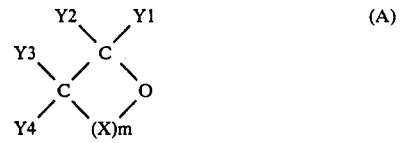

wherein "Y1" to "Y4" denote a hydrogen atom or an alkyl group with one to six carbons, and may or may not be the same; "X" denotes $-CH_2-$ or $-OCH_2-$ in which hydrogens may be substitued by an alkyl group; and "m" denotes an integer in the range from 0 to 3. In addition, as far as "m"=1, "X" may be either $-(-CH_2)_p-O-CH_2-$ or $-OCH_2-(-CH_2-)_p-OCH_2-$ wherein "p" is an integer in the range from 1 to 3.

The compounds particularly preferable as the cyclic ether as specified by the above general formula (A) include ethylene oxide, propylene oxide, 1,3-dioxolane, 1,3-dioxane, 1,3-dioxepane, 1,3,5-trioxepane, 1,3,6-trioxocane, and epichlorohydrin.

It is required for this invention that the amount of copolymerized cyclic ether be $3 \times 10^{-5}$ to $3 \times 10^{-1}$ moles, preferably in the range of $6 \times 10^{-5}$ to $2 \times 10^{-1}$ moles with respect to one mole of trioxane; with less than $3 \times 10^{-5}$ moles, the resulting polymer provides lower thermal stability, while with more than $3 \times 10^{-1}$ moles, the resulting polymer has a lower melting point and poor crystallinity which decreases the mechanical strength and moldability.

As the polymerization catalyst in this invention, one or more compounds selected from a group of boron trifluoride, boron trifluoride hydrate, and coordination compound of an organic compound having an oxygen or sulphur atom with boron trifluoride are used in a form of gas, liquid or solution dissolved in a suitable organic solvent. The organic compound having an oxygen or sulphur atom used to form the coordination compound with boron trifluoride includes alcohol, ether, phenol, and sulfide. Among these catalysts, the coordination compound of boron trifluoride with an organic compound having an oxygen atom is especially desirable; in particular, boron trifluoride diethyletherate and boron trifluoride dibuthyletherate are preferably used.

The solvent for use with the polymerization catalyst in this invention includes aromatic hydrocarbons such as benzene, toluene, and xylene; aliphatic hydrocarbons such as n-hexane, n-heptane, and cyclohexane; alcohols such as methanol and ethanol; halogenated hydrocarbons such as chloroform, dichloromethane, and 1,2-dichloroethane; and ketones such as acetone and methylethyl ketone.

The added amount of the polymerization catalyst is $5 \times 10^{-6}$ to $1 \times 10^{-1}$ moles, preferably $1 \times 10^{-5}$ to $1 \times 10^{-2}$ moles with respect to one mole of trioxane.

The polymerization of trioxane and cyclic ether may be in either a solution mode or substantially solventless mode, although the solventless bulk polymerization is advantageous in terms of cost because the post-treatment is easy.

Since radical hardening and heat generation occur in the bulk polymerization, it is desirable to use equipment capable of providing powerful agitation and of controlling the reaction temperature.

The polymerization equipment with such capabilities includes a kneader having Sigmate agitation blades; a mixer using a cylindrical barrel as the reaction zone in which a screw with a number of intermittent threads is coaxially located in such a way that the teeth projected from the internal surface of the barrel are engaged with the intermittent parts of the screw threads during operation; and a general screw extruder with a pair of parallel screws which are located so as to be engaged with each other in a long case having a heat or cooling jacket. Polymerization equipment also needs a self-cleaning type mixer provided with a number of paddles on two horizontal agitating axes so that these axes are rotated simultaneously in the same direction with a slight clearance kept between the corresponding paddles and also between the paddles and internal surface of the case. In the bulk polymerization, sudden hardening occurs and, therefore, the powerful agitating capability is required only in the early stage of the polymerization reaction. Once the hardened product is broken into fragments, strong agitation is no longer necessary. Accordingly, the bulk polymerization process may be divided into two steps.

The polymerization reaction temperature is preferably in the range from 30° to 140° C., particularly in the range from 60 to 90° C.

Since in the early stage of the polymerization the temperature in the reaction equipment tends to increase due to reaction heat generation, it is desirable to control the reaction temperature by passing the cooling water through the jacket or the like. The typical hindered amine compound for use in this invention in order to deactivate the boron trifluoride catalyst to inhibit the polymerization reaction is represented by the following general formula (B):

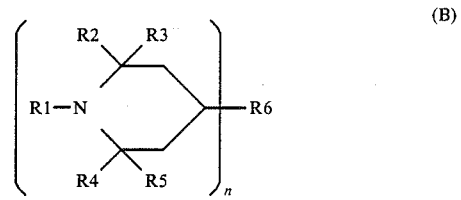

(B)

wherein R1 denotes a hydrogen atom or hydrocarbon group with 1 to 30 carbons; R2 to R5 represents an alkyl group with 1 to 5 carbons, which may or may not be the same; "n" denotes an integer in the range from 1 to 30; and R6 denotes the n-valent hydrocarbon group.

Namely, the following compounds may be included.

| No | n | R | No | n | R | No | n | R | No | n | R |
|---|---|---|---|---|---|---|---|---|---|---|---|
| A-1 | 0 | H | E-1 | 4 | H | I-1 | 0 | H | L-1 | 6 | H |
| A-2 | 0 | Me | E-2 | 4 | Me | I-2 | 0 | Me | L-2 | 6 | Me |
| B-1 | 1 | H | F-1 | 6 | H | J-1 | 1 | H | M-1 | 8 | H |
| B-2 | 1 | Me | F-2 | 6 | Me | J-2 | 1 | Me | M-2 | 8 | Me |
| C-1 | 2 | H | G-1 | 8 | H | K-1 | 4 | H | N-1 | 10 | H |
| C-2 | 2 | Me | G-2 | 8 | Me | K-2 | 4 | Me | N-2 | 10 | Me |
| D-1 | 3 | H | H-1 | 10 | H | | | | | | |
| D-2 | 3 | Me | H-2 | 10 | Me | | | | | | |

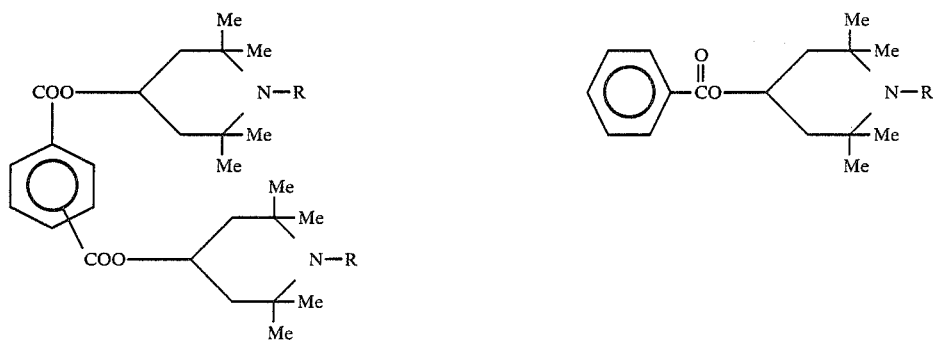

-continued
| No  | Orientation   | R  |
|-----|---------------|----|
| P-1 | o-orientation | H  |
| P-2 | o-orientation | Me |
| Q-1 | m-orientation | H  |
| Q-2 | m-orientation | Me |
| R-1 | p-orientation | H  |
| R-2 | p-orientation | Me |
| No  | R  |
|-----|----|
| S-1 | H  |
| S-2 | Me |
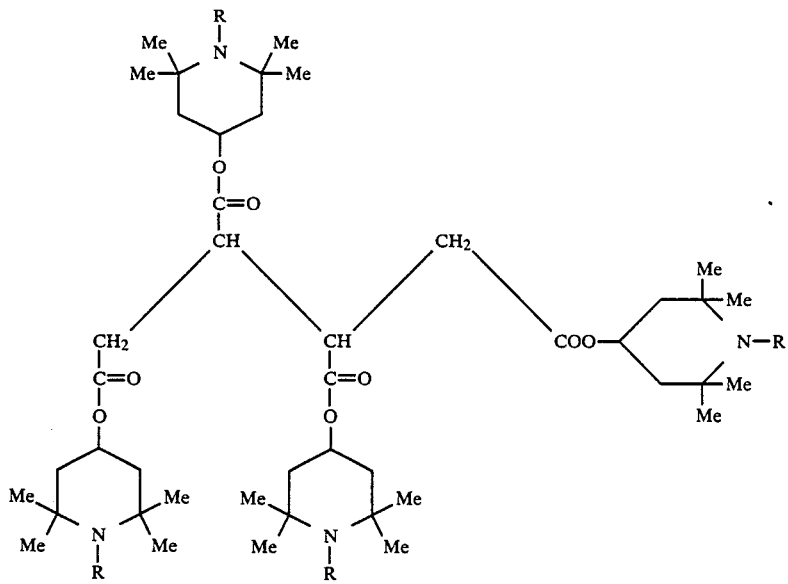
| No  | R  |
|-----|----|
| T-1 | H  |
| T-2 | Me |
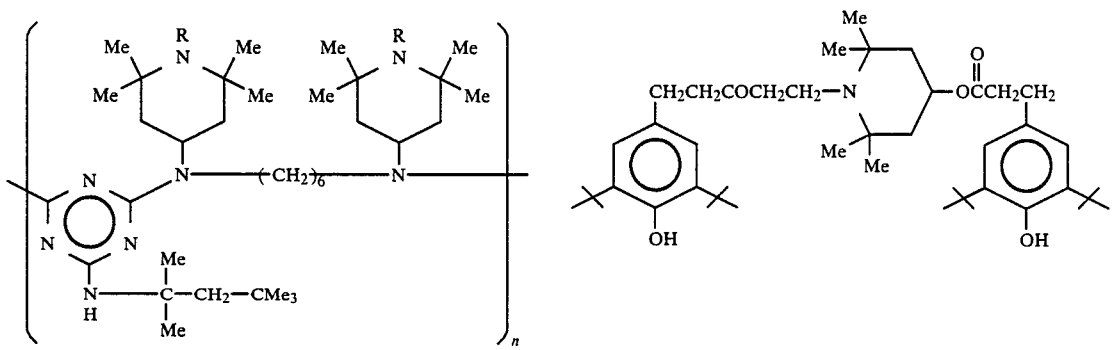
| No  | R  |
|-----|----|
| U-1 | H  |
| U-2 | Me |
| No  | R  |
|-----|----|
| V-1 | H  |
| V-2 | Me |

-continued

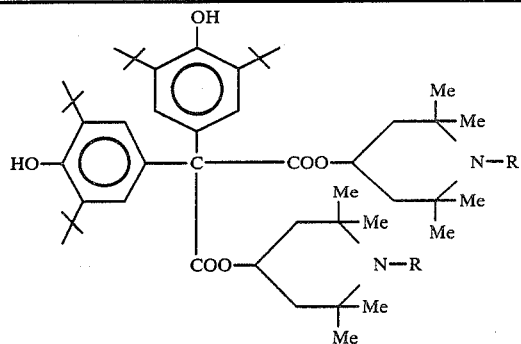
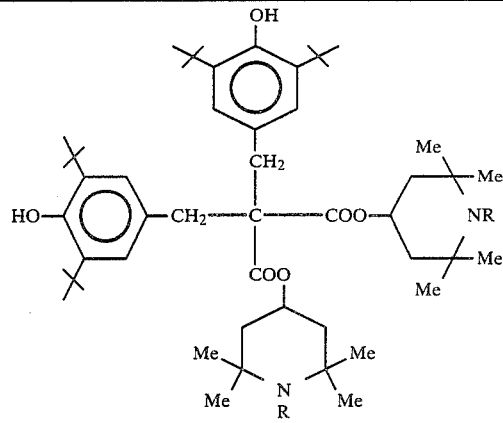

| No | R |
|---|---|
| W-1 | H |
| W-2 | Me |

| No | R |
|---|---|
| X-1 | H |
| X-2 | Me |

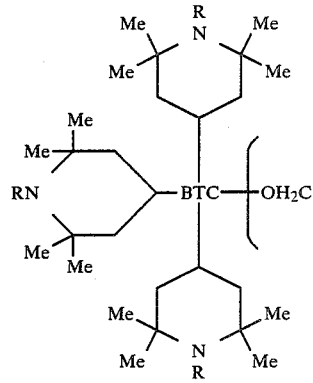
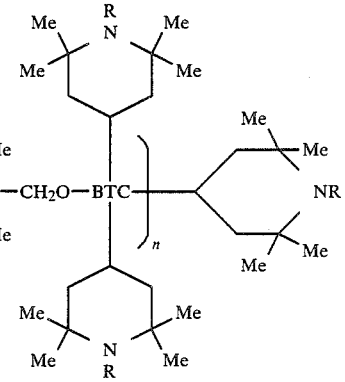

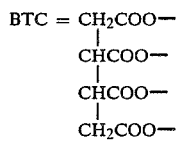

| No | R |
|---|---|
| Y-1 | H |
| Y-2 | Me |

Of these hindered amine compounds, the tertiary amine type is especially desirable because the resulting polymer provides the excellent color tone.

The added amount of the hindered amine compound should be decided so as to provide the hindered amine structure of moles equivalent to or more than that of the boron trifluoride catalyst used for the polymerization.

Even if the mole number of the hindered amine structure is less than that of the catalyst, deactivation effect on the catalyst is observed, but the heat resistance of the derived polymer is slightly lowered. Thus, it is necessary to control the added amount depending on the aimed degree of heat resistance.

After deactivation of the catalyst, unstable chain ends of the polymer are degraded for stabilization. At that time, it is desirable to add a degradation accelerator including: hydroxide, inorganic acid salt, organic acid salt, and alkoxide of alkaline metals and alkali earth metals. Namely, the following compounds may be included: Lithium hydroxide, sodium hydroxide, potassium hydroxide, magnesium hydroxide, calcium hydroxide, barium hydroxide, sodium carbonate, potassium carbonate, sodium bicarbonate, sodium phosphate, sodium borate, sodium sulfite, sodium thiosulfate, sodium hydrogensulfate, sodium silicate, sodium oxalate, sodium acetate, magnesium acetate, sodium benzoate, sodium terephthalate, sodium methoxide, potassium methoxide, sodium ethoxide, potassium ethoxide, magnesium ethoxide, sodium isopropoxide, sodium phenoxide, and n-butyl lithium.

The added amount of the degradation accelerator employed in this invention is 0.001 to 5 parts, preferably 0.05 to 3 parts, with respect to 100 parts of the copolymer, taking the parts by weight. If it is less than 0.001 parts, the resulting copolymer provides poor thermal stability. On the other hand, if it is more than 5 parts, the mechanical properties and antihydrolysis resistance will be lowered.

The stabilization may be carried out either in a solution or without a solvent, although the solventless process is advantageous in terms of cost because the recovery of the solvent is not necessary.

In the stabilization process, it is preferable to add an antioxidant in order to suppress the decomposition of the polymer main chains; use of a hindered phenolic antioxidant is particularly desirable.

The hindered phenolic antioxidant used in this invention may include a compound which is represented by the following general formula (C):

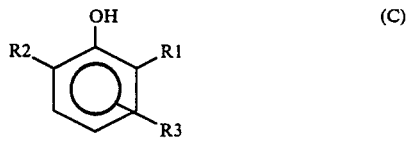

wherein R1 and R2 denote an alkyl group with 1 to 6 carbons, triazolyl group, or substituted triazolyl group, which may or may not be the same; and R3 denotes a hydrogen atom or an amino group, or monovalent organic group such as an alkyl group, substituted alkyl group, aryl group, substituted aryl group, alkoxy group, aryloxy group, and substituted amino group each with 1 to 99 carbons.

Namely, the following compounds may be included: 2,2-methylenebis (4-methyl-6-tert-butyl phenol), triethylene glycol-bis [3-(3-tert-butyl-5-methyl-4-hydroxyphenyl) propionate], 2,2-thio-diethylene bis [3-(3,5-di-tert-butyl-4-hydroxyphenyl) propionate], pentaerythrityl-tetrakis [3-(3,5-di-tert-butyl4-hydroxyphenyl) propionate], 1,6-hexanediol-bis [3-(3,5-di- tert-butyl-4-hydroxylphenyl) propionate], 2,4-bis-(n-octylthio) -6-(4-hydroxy-3,5-di-tert-butylanilino)-1,3,5-triazine, octadecyl 3-(3,5-di-tert-butyl-4-hydroxyphenyl) propionate; 1,3,5-trimethyl-2,4,6-tris (3,5-di-tert-butyl-4-hydroxybenzyl) benzene; 2,2-thiobis (4-methyl-6-tert-butylphenol); 1,3,5-tris (4-tert-butyl-3-hydroxy-2,6-dimethylbenzyl) isocyanuric acid; 3,5-di-tert-butyl-4-hydroxybenzylphosphonate diethylester; N,N'-hexamethylene bis (3,5-di-tert-butyl-4-hydroxyhydrocinnamamide), bis (3, 5-di- tert-butyl-4-hydroxybenzyl phosphonic acid ethylester) calcium; N,N'-bis [3-(3,5-di-tert-butyl-4-hydroxyphenyl) propionyl] hydrazine; 2-[2-hydroxy-3,5-bis (α,α-dimethylbenzyl) phenyl]-2H-benzotriazole; 2-(3,5-di-tert-amyl-2-hydroxyphenyl) benzotriazole; 2-(3-tert-butyl-5-methyl-2-hydroxyphenyl)- 5-chlorobenzotriazole; 2-(3,5-di-tert-butyl-2-hydroxyphenyl)- 5-chlorobenzotriazole; 2-(3,5-di-tert-butyl-2-hydroxyphenyl) benzotriazole; stearyl 3-(3,5-di-tert-butyl-4-hydroxyphenyl) propionate; and 2,2-bis [3-(3,5-di-tert-butyl-4-hydroxyphenyl propanoyloxy) methyl]-1,3-propanediol-bis [3-(3,5-di-tert- butyl-4-hydroxyphenyl) propionate].

The added amount of the hindered phenolic antioxidant used in this invention is in the range from 0.001 to 5 parts, preferably in the range from 0.05 to 3 parts, with respect to 100 parts of the copolymer, taking the parts by weight.

With less than 0.001 parts by weight, the resulting products provide the lower thermal stability, while with more than 5 parts by weight, the antioxidant will be precipitated in a powdery form on the surface of the oxymethylene copolymer. Although the oxymethylene copolymer as it is derived in accordance with the present invention is sufficiently excellent in heat resistance, it is further enhanced by mixing a formaldehyde capturing agent including N,N-dimethylformamide N,N-dimethylacetamide N,N-diphenylformamide, N,N-diphenylacetamide, N,N-diphenylbenzamide, N,N,N,N-tetramethyladipamide, oxaloyl dianilide, adipoyl dianilide, N-phenylacetanilide; homopolymers or copolymers of lactums such as Nylon 6, Nylon 11, Nylon 12; polyamide homopolymers or copolymers which are derived from dicarboxylic acid such as adipic acid, Sebacic acid, decane dicarboxylic acid, and dimer acid, and diamine such as ethylene diamine, tetramethylene diamine, hexamethylene diamine, and m-xylilene dimine; polyamide copolymers derived from lactum dicarboxylic acid and diamine; amide compounds such as polyacrylamide, polymethacrylamide, N,N-bis (hydroxymethyl) suberamide, poly (γ-methylglutamate), poly (γ-ethylglutamate), poly (N-vinyllactum), and poly (N-vinylpyrrolidone); polyurethane derived from diisocyanate such as toluene diisocyanate and diphenylmethane diisocyanate, and glycol such as 1,4-butanediol or high molecular glycol such as poly tetramethyleneoxide) glycol, polybuthyleneadipate, and polycaprolactone; triazine derivatives such as: melamine, benzonguanamine, acetoguanamine, N-butylmelamine, N-phenylmelamine, N,N-diphenylmelamine, N,N,N-triphenylmelamine, N-methylolmelamine, N,N-dimethylolmelamine, N,N,N- trimethylolmelamine, 2,4-diamino-6-benzyloxytriazine, 2,4-diamino-6-cyclohexyltriazine, melem, melam, and melon; urea derivatives such as N-phenylurea, N,N-diphenylurea, thiourea, N-phenylthiourea, N,N-diphenylthiourea, and nonamethylene polyurea; hydrazine derivatives such as phenylhydrazine, diphenyl hydrazine, benzaldehyde hydrazone, benzaldehyde semicarbazone, benzaldehyde-1-methyl-1-phenylhydrazone, benzaldehyde thiosemicarbazone; amidine compounds such as dicycandiamide, guantidine, guanidine, aminoguanidine, guanine, guanacline, guanochlor, guanoxane, guanosine, amiloride, and N-amidino-3-amino-6-chloro- pyrazine carboxyamide; and pyridine derivatives such as poly (2-vinylpyridine), poly (2-methyl-5-vinylpyridine), poly (2-ethyl-5-vinylpyridine), and 2-vinylpyridine/styrene copolymer.

In particular, polyamides derived from dimer acid, melamine, guanamine, benzoguanamine, N-methylolmelamine, N-methylolbenzoguanamine, thermoplastic polyurethane, dicyandiamide, guanidine, poly (vinylpyrrolidine), poly (2-vinylpyridine), polyurea, melem,-melam are especially preferable for higher thermal stability of the resulting oxymethylene copolymer.

The added amount of the formaldehyde capturing agent is 0.001 to 5 parts by weight, preferably 0.05 to 3 parts by weight, with respect to 100 parts by weight of the oxymethylene copolymer. With less than 0.001 parts by weight, the resulting polymer provides insufficient thermal stability. With more than 5 parts by weight, the formaldehyde capturing agent is precipitated on the surface of the composition and/or the polymer is colored. The process of this invention comprises polymerizing trioxane and cyclic ether in the presence of a boron trifluoride catalyst, inhibiting polymerization reaction by adding a hindered amine compound as the agent for deactivating the catalyst, and adding and milling a degradation accelerator and a hindered phenolic antioxidant. These additives may be added sequentially one by one, or all at the same time. In addition, the additives may be added as they are, or in the form of solution in the organic solvent, which may include: aromatic hydrocarbon such as toluene and xylene; aliphatic hydrocarbons such as n-hexane, n-heptane, and cyclohexane; alcohols such as methanol and ethanol; halogenated hydrocarbons such as chloroform, dichloromethane, and 1,2-dichloroethane; and ketones such as acetone and methylethyl ketone.

In addition, as far as the effect of this invention is not affected, the following additives may be optionally added to the polymer of this invention: filler such as calcium carbonate, barium sulfate, clay, titanium dioxide, silicon oxide, and mica powder; reinforcements such as carbon fiber, fiberglass, ceramic fiber, and aramide fiber; colorant (pigment and/or dye); nucleating agent; plasticizer; mold release agent; flame retardant; antistatic agent; electrical conductor; tackifier; lubricant; hydrolytic stabilizer, and adherent additives. As shown in the examples given below, the oxymethylene copolymer with excellent heat resistance can be produced by a very simple process according to this invention without removing the catalyst by washing.

In addition, the oxymethylene copolymer obtained in accordance with this invention is excellent in moldability, mechanical properties, and melting stability as well as the heat resistive aging capability, so that it can be used in a variety of applications including the parts in mechanical mechanisms, automobiles, and electric and electronic equipment.

EXAMPLES

The following examples and comparisons further illustrate this invention. Meanwhile, the surface condition of the molded products, mechanical properties, relative viscosity ($\eta r$), heating decomposition rate (K), polymer melting point (Tm) and crystallization temperature (Tc) as mentioned in the examples and comparisons are measured in the following manner.

Surface condition of the molded products:

Using an injection molder capable of injecting 5 oz. at a time, ASTM No. 1 dumbbell test pieces and Izod impact test pieces were injection-molded with the cylinder temperature set to 230° C., molding temperature to 80°, and molding cycle to 50 sec. Visual inspection was then carried out on the surface of the ASTM No. 1 dumbbell test pieces.

Mechanical properties:

Using ASTM No. 1 dumbbell test pieces obtained by the above-mentioned injection-molding, tensile characteristics was measured in accordance with ASTM D-638. In addition, using Izod impact test pieces, the impact strength was measured in accordance with ASTM D-256.

Relative viscosity ($\eta r$):

0.5 g of the polymer was dissolved in 100 ml of p-chlorophenol containing 2% of α-pinene, and then the viscosity was measured at 60° C.

Heating decomposition rate (Kx):

"Kx" means the decomposition rate of the material which is allowed to stand for a predetermined period of time at X° C. Using a thermobalancer, about 10 mg of the sample was allowed to stand in the atmosphere of air at X° C., and then the rate was determined by the following equation:

$$Kx = (W_o - W_1) \times 100/W_0 \, (\%)$$

wherein Wo means the weight of the sample before heating, and $W_1$ means the weight of the sample after heating. DuPont's Thermal Analyzer 1090/1091 was used as the thermal balancer.

Polymer melting point (Tm) and crystallization temperature (Tc):

Using a differential scanning calorimeter, the polymer melting point (Tm) was measured in the atmosphere of nitrogen while increasing the temperature at 10° C./min. Then, the crystallization temperature (Tc) was measured while decreasing the temperature at 10° C./min.

REFERENCE EXAMPLE 1

A kneader of 3 liters in capacity equipped with two sigmate agitating blades was heated to 80° C. Then, 3.0 kg of trioxane, 112 g of 1,3-dioxolane, and as the catalyst, boron trifluoride diethyletherate in concentration of 100 ppm with respect to the weight of trioxane in the form of 10% benzene solution were introduced into the kneader and then stirred at 30 rpm. The contents were immediately hardened, and the temperature in the system rose up to 100° C. in 3 min. due to the reaction heat and frictional heat.

The agitation continued as it was for 10 min. further and then the polymer was taken out of the kneader. The polymer thus obtained was in the form of white powder showing the viscosity $\eta r = 2.37$. This polymer is referred to as oxymethylene copolymer "A" in the following description.

REFERENCE EXAMPLE 2

The bulk polymerization was carried out in the same way as Reference Example 1, except that 66 g of ethylene oxide was used in place of 1,3-dioxolane.

The polymer thus obtained was in the form of white powder showing the viscosity $\eta r = 2.40$.

This polymer is referred to as oxymethylene copolymer "B" in the following description.

EXAMPLES 1 TO 5; COMPARISONS 1 AND 2

To 3.0 kg of oxymethylene copolymer "A" as obtained in Reference Example 1 above, various hindered amine compounds having the structural formulae previously illustrated were added in proportions as shown in Table 1 in the form of about 20% benzene solution. They were milled for 5 min. at 35° C. Then, calcium hydroxide of 3 parts by weight and pentaerythrityl-tetrakis [3-(3,5-di-tert-butyl-4-hydroxyphenyl) propionate] ("Irganox" 1010 by Ciba-Geigy) of 15 parts by weight were added, and after the temperature was increased to 210° C. in 10 min., they were milled for 20 min. at that temperature.

For comparison, the oxymethylene copolymer was produced using tri (n-butyl) amine in place of a hindered amine compound. The copolymers thus produced provide the measurements on various physical properties as shown in Table 1. From this table, it is clearly observed that the copolymers according to this invention provide excellent properties independently of the types of hindered amine compounds employed.

EXAMPLE 6

To oxymethylene copolymer "A" as obtained in Reference Example 1, a hindered amine compound, calcium hydroxide, and "Irganox" 1010 were added simultaneously in the same proportions as Example 2, and they were milled for 5 min. at 35° C. Then, the temperature was increased to 210° C. in 10 min., and then the milling was again carried out for 20 min. at that temperature. The copolymer thus obtained provided the measurements on various physical properties as shown in Table 1.

EXAMPLE 7

To 3.0 kg of oxymethylene copolymer "A" as obtained in Reference Example 1 above, a hindered amine compound, calcium hydroxide, and "Irganox" 1010 were added simultaneously in the same proportions as Example 2, and they were milled for 5 min. at 35° C. Then, the temperature was increased to 210° C. in 10 min. and the milling was again carried out for 20 min. at that temperature. Then, dicyandiamide of 3 parts by weight was added, which was followed by milling for The polymers thus obtained provided the measurements on the various physical properties as shown in Table 2. It is clearly noticed from this table that the polymers according to this invention provide excellent properties regardless of type of degradation accelerator used and of milling mode.

TABLE 2

| | Degradation Accelerator | | Antioxidant Ir1010 (in parts by weight) | Polymer Melting Point (°C.) | Crystallization Temperature (°C.) | $\eta r$ | Mechanical Properties | | | Surface Condition of Molded Product | K222 60 min. (%) | K240 60 min. (%) |
|---|---|---|---|---|---|---|---|---|---|---|---|---|
| | Type | Added Amount (in parts by weight) | | | | | Tensile Strength (MPa) | Rupture Elongation (%) | Izod Impact Value | | | |
| Example 8 | Mg(OH)2 | 3 | 15 | 168 | 145 | 2.06 | 59 | 50 | 5.9 | Good | 0.8 | 3.7 |
| Example 9 | " | 3 | 15 | 168 | 145 | 2.05 | 63 | 53 | 6.2 | Good | 0.6 | 3.8 |
| Example 10 | " | 3 | 15 | 168 | 145 | 2.01 | 59 | 50 | 5.8 | Good | 0.4 | 3.0 |
| Example 11 | K2CO3 | 3 | 15 | 168 | 145 | 2.03 | 62 | 51 | 6.0 | Good | 0.7 | 3.6 |
| Example 12 | " | 3 | 15 | 168 | 145 | 2.02 | 62 | 51 | 6.0 | Good | 0.6 | 3.8 |
| Example 13 | " | 3 | 15 | 168 | 145 | 2.05 | 61 | 51 | 6.0 | Good | 0.3 | 3.0 |

Ir1010: Irganox 1010 (produced by Ciba-Geigy)
Izod Impact Value: with ½ knotches; (unit: kg · cm/cm)
Sequential addition mode is used in Examples 8 and 11; simultaneous addition mode is used in Examples 9 and 12.
In examples 10 and 13, Dicyandiamide of 3 parts by weight is added as the formaldehyde capturing agent.

another 10 min. at the same temperature. The polymer thus obtained provided the measurements on various physical properties as shown in Table 1. From Example 2 (sequential addition mode) and Example 6 (simultaneous addition mode), it is clearly shown that the compolymers according to this invention has excellent physical properties regardless of milling mode.

It is also noticed from Example 7 that the heat resistance is further improved by adding the formaldehyde capturing agent.

EXAMPLES 14 to 19

The polymers were produced in the same way as Examples 2, 6 and 7 except that triethyleneglycol-bis [3-(3-tert-butyl-5-methyl4-hydroxyphenyl) propionate] ("Irganox" 245 by Ciba-Gigy) and N,N-hexamethylene-bis (3,5-di-tert-butyl-4-hydroxyhydrocinnamamide) ("Irganox" 1098 by Ciba-Geigy) were used in place of Pentaerythrityl-tetrakis [3-(3,5-di-tert-butyl-4hydroxyphenyl) propionate].

TABLE 1

| | Hindered Amine | | Antioxidant Ir1010 (in parts by weight) | Degradation Accelerator Ca(OH)2 (in parts by weight) | Polymer Melting Point (°C.) | Crystallization Temperature (°C.) | $\eta r$ | Mechanical Properties | | | Surface Condition of Molded Product | K222 60 min. (%) | K240 60 min. (%) |
|---|---|---|---|---|---|---|---|---|---|---|---|---|---|
| | Type | Added Amount (in parts by weight) | | | | | | Tensile Strength (MPa) | Rupture Elongation (%) | Izod Impact Value | | | |
| Example | | | | | | | | | | | | | |
| 1 | G-2 | 3 | 15 | 3 | 167 | 141 | 1.99 | 61 | 49 | 5.3 | Normal | ~2.0 | 6.6 |
| 2 | " | 12 | 15 | 3 | 168 | 145 | 2.05 | 63 | 53 | 6.2 | Good | 0.6 | 3.8 |
| 3 | J-2 | 12 | 15 | 3 | 168 | 145 | 2.10 | 62 | 51 | 6.2 | Good | 0.4 | 3.6 |
| 4 | S-1 | 12 | 15 | 3 | 168 | 145 | 2.03 | 62 | 51 | 6.1 | Good | 0.8 | 3.9 |
| 5 | U-2 | 12 | 15 | 3 | 168 | 145 | 2.04 | 63 | 52 | 6.0 | Good | 0.6 | 3.9 |
| 6 | G-2 | 12 | 15 | 3 | 168 | 145 | 2.03 | 62 | 52 | 6.0 | Good | 0.8 | 4.0 |
| 7 | " | 12 | 15 | 3 | 168 | 145 | 2.04 | 61 | 52 | 6.0 | Good | 0.4 | 3.0 |
| Comparison | | | | | | | | | | | | | |
| 1 | TNB | 3 | 15 | 3 | 159 | 134 | 1.35 | Impossible to mold because of decomposition and foaming | | | | 90.1 | 98.4 |
| 2 | " | 12 | 15 | 3 | 158 | 133 | 1.40 | | | | | 89.2 | 97.3 |

TNB: Tri (n-butyl) amine
Ir1010: Irganox 1010 (produced by Ciba-Geigy)
Izod Impact Value: with ½ knotches; (unit: kg · cm/cm)
In Example 7 only, dicyandiamide of 3 parts by weight was added as the formaldehyde capturing agent.

EXAMPLES 8 to 13

The polymers were produced in the same way as Examples 2, 6, and 7 except that magnesium hydroxide and potassium carbonate are used in place of calcium hydroxide.

The polymers thus obtained provided the measurements on the various physical properties as shown in Table 3. It is clearly noticed from this table that the polymers according to this invention have excellent physical properties regardless of type of antioxidant used and of milling mode.

TABLE 3

| | Antioxidant Type | Added Amount (in parts by weight) | Degradation Accelerator Ca(OH)₂ (in parts by weight) | Polymer Melting Point (°C.) | Crystallization Temperature (°C.) | ηr | Mechanical Properties | | | Surface Condition of Molded Product | K222 60 min. (%) | K240 60 min. (%) |
|---|---|---|---|---|---|---|---|---|---|---|---|---|
| | | | | | | | Tensile Strength (MPa) | Rupture Elongation (%) | Izod Impact Value | | | |
| Example 14 | Ir 245 | 15 | 3 | 168 | 145 | 2.03 | 60 | 50 | 5.9 | Good | 0.8 | 3.9 |
| Example 15 | " | 15 | 3 | 168 | 145 | 2.05 | 63 | 53 | 6.2 | Good | 0.6 | 3.7 |
| Example 16 | " | 15 | 3 | 168 | 145 | 2.09 | 63 | 53 | 6.1 | Good | 0.3 | 2.7 |
| Example 17 | Ir1098 | 15 | 3 | 168 | 145 | 2.02 | 62 | 51 | 6.0 | Good | 0.7 | 3.8 |
| Example 18 | " | 15 | 3 | 168 | 145 | 2.02 | 61 | 51 | 6.0 | Good | 0.8 | 3.8 |
| Example 19 | " | 15 | 3 | 168 | 145 | 2.01 | 60 | 50 | 5.8 | Good | 0.4 | 3.2 |

Ir 245: Irganox 245 (produced by Ciba-Geigy)
Ir1098: Irganox 1098 (produced by Ciba-Geigy)
Izod Impact Value: with ½ knotches; (unit: kg · cm/cm)
Sequential addition mode is used in Examples 14 and 17; simultaneous addition mode is used in Examples 15 and 18.
In examples 16 and 19, dicyandiamide of 3 parts by weight is added as the formaldehyde capturing agent.

EXAMPLES 20 to 21

The polymers were produced in the same way as Example 7 except that melamine and polyamide derived from dimer acid were used in place of dicyandiamide.

The polymers thus obtained provided the measurements on various physical properties as shown in Table 4. It is clearly noticed from this table that the polymers according to this invention have excellent physical properties regardless of type of formaldehyde capturing agent used.

TABLE 4

| | Formaldehyde Capturing Agent Type | Added Amount (in parts by weight) | Polymer Melting Point (°C.) | Crystallization Temperature (°C.) | ηr | Mechanical Properties | | | Surface Condition of Molded Product | K222 60 min. (%) | K240 60 min. (%) |
|---|---|---|---|---|---|---|---|---|---|---|---|
| | | | | | | Tensile Strength (MPa) | Rupture Elongation (%) | Izod Impact Value | | | |
| Example 20 | Melamine | 3 | 168 | 145 | 2.05 | 60 | 50 | 5.9 | Good | 0.4 | 3.1 |
| Example 21 | Milbex | 3 | 168 | 145 | 2.04 | 61 | 51 | 6.0 | Good | 0.3 | 3.0 |

Izod Impact Value: with ½ knotches; (unit: kg · cm/cm)
Milbex: Milbex 1000 (polyamide derived from dimer acid produced by Nihon General Mills)
As the antioxidant used was Irganox 1010 (by Ciba-Geigy) of 15 parts by weight.
As the degradation accelerator used was calcium hydroxide of 3 parts by weight.

EXAMPLES 22 to 24

The polymers were produced in the same way as Examples 2, 6, and 7 except that oxymethylene copolymer "B" as obtained in Reference Example 2 was used.

The polymers thus obtained provided the measurements on the various physical properties as shown in Table 5. It is clearly noticed from this table that polymers excellent in physical properties can be produced even if the co-monomer is changed.

TABLE 5

| | Polymer Melting Point (°C.) | Crystallization Temperature (°C.) | ηr | Mechanical Properties | | | Surface Condition of Molded Product | K222 60 min. (%) | K240 60 min. (%) |
|---|---|---|---|---|---|---|---|---|---|
| | | | | Tensile Strength (MPa) | Rupture Elongation (%) | Izod Impact Value | | | |
| Example 22 | 168 | 145 | 2.05 | 63 | 53 | 6.2 | Good | 0.6 | 3.6 |
| Example 23 | 168 | 145 | 2.04 | 61 | 51 | 5.9 | Good | 0.7 | 3.8 |
| Example 24 | 168 | 145 | 2.03 | 61 | 50 | 5.8 | Good | 0.3 | 3.0 |

Izod Impact Value: with ½ knotches; (unit: kg · cm/cm)
As the antioxidant used was Irganox 1010 (by Ciba-Geigy) of 15 parts by weight.
As the degradation accelerator used was calcium hydroxide of 3 parts by weight.
Sequential addition mode is used in Example 22; simultaneous addition mode in Example 23. In Example 24, dicyandiamide of 3 parts by weight is added as the formaldehyde capturing agent.

What is claimed is:

1. A process for producing an oxymethylene copolymer, comprising polymerizing trioxane and cyclic ether in the presence of at least one type of polymerization catalyst selected from the group consisting of: (a) boron trifluoride, (b) boron trifluoride hydrate, and (c) coordination compounds formed of: (c1) boron trifluoride and (c2) organic compounds containing an atom of oxygen or sulphur, adding a hindered amine compound to the polymer obtained by said polymerization; and then stabilizing unstable chain ends of the polymer.

2. A process for producing an oxymethylene copolymer according to claim 1, wherein the hindered amine compound is expressed by formula (B):

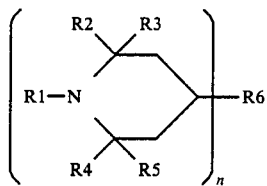

(B)

wherein R1 represents a hydrogen atom or a hydrocarbon group of 1 to 30 carbons; R2 to R5 represent alkyl groups of 1 to 5 carbons; R1 to R5 may or may not be the same; n represents an integer in the range from 1 to 30; and R6 represents an n-valent hydrocarbon group.

3. A process for producing an oxymethylene copolymer according to claim 1, wherein the added amount of the hindered amine compound is 0.001 to 5.0 parts by weight with respect to 100 parts by weight of the polymer.

4. A process for producing an oxymethylene copolymer according to claim 1, wherein the cyclic ether has the formula (A):

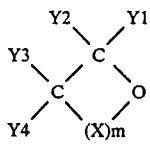

(A)

wherein Y1 to Y4 represent hydrogen atoms or alkyl groups of 1 to 6 carbons, and may or may not be the same; X represents either —CH$_2$— or OCH$_2$— in which the hydrogens may be substituted by an alkyl group; m represents an integer from 0 to 3, and when m=1, X may be either —(—CH$_2\phi$)$_p$—OCH$_2$ or —OCH$_2$—(—CH$_2\phi$)$_p$—OCH$_2$— and p is an integer from 1 to 3.

5. A process for producing an oxymethylene copolymer according to claim 1, wherein the added amount of cyclic ether is $3 \times 10^{-5}$ to $3 \times 10^{-1}$ moles with respect to one mole of trioxane.

6. A process for producing an oxymethylene copolymer according to claim 1, wherein the polymerization catalyst is a coordination compound formed of boron trifluoride and a compound containing an oxygen atom.

7. A process for producing an oxymethylene copolymer according to claim 1, wherein the added amount of the polymerization catalyst is $5 \times 10^{-6}$ to $1 \times 10^{-1}$ moles with respect to one mole of trioxane.

8. A process for producing an oxymethylene copolymer according to claim 1, wherein the polymerization temperature is 30 to 140° C.

9. A process for producing an oxymethylene copolymer according to claim 1, wherein the polymerization is carried out substantially in the solventless state.

10. A process for producing an oxymthylene copolymer according to claim 1, wherein the polymerization catalyst is added in a form dissolved in an organic solvent having its boiling point in the range from 20 to 200° C. under the atmospheric pressure.

11. A process for producing an oxymethylene copolymer according to claim 1, wherein cyclic ether and catalyst are mixed in advance and then put into contact with trioxane.

12. A process for producing an oxymethylene copolymer according to claim 1, wherein the stabilizing process comprises heating the polymer at 100° to 270° C.

13. A process for producing an oxymethylene copolymer according to claim 12, wherein at least one type of antioxidant and at least one type of degradation accelerator selected from hydroxides, inorganic acid salts, organic acid salts, and alkoxides of alkaline metals and alkali earth metals are added in the stabilizing process.

14. A process for producing an oxymethylene copolymer according to claim 13, wherein the antioxidant is expressed by the following formula (C):

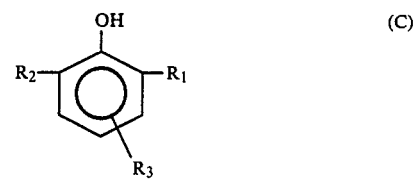

(C)

wherein R1 and R2 are alkyl groups of 1 to 6 carbons, triazolyl groups, or substituted triazolyl groups, and may or may not be the same; and R3 represens a hydrogen atom, an amino group, or a monovalent organic group such as an alkyl group, a substituted alkyl group, an aryl group, a substituted aryl group, an alkoxy group, an aryloxy group, or a substituted amino group of 1 to 99 carbons.

15. A process for producing an oxymethylene copolymer according to claim 13, wherein the degradation accelerator is at least one type of compound selected from the group consisting of hydroxides, carbonates, phosphates, borates, sulfites, hydrogensulfates, silicates, oxalates, acetates, benzoates, isophthalates, terephthalates, phthalates, methoxide, ethoxides, isopropoxides, and phenoxides of lithium, sodium, potassium, magnesium, calcium, and barium.

16. A process for producing an oxymethylene copolymer according to claims 13 or 14, wherein the added amount of the antioxidant is 0.001 to 5.0 parts by weight with respect to 100 parts by weight of the polymer.

17. A process for producing an oxymethylene copolymer according to claim 13 or 15, wherein the added amount of the degradation accelerator is 0.001 to 5.0 parts by weight with respect to 100 parts by weight of the polymer.

18. A process for producing an oxymethylene copolymer according to claim 1, wherein the stabilizing process comprises melting and milling the polymer at the temperature in the range from the melting point of the polymer to 270° C.

19. A process for producing an oxymethylene copolymer according to claim 18, wherein the pressure in the system is kept lower than the atmospheric pressure in melting and milling the polymer.

20. A resinous composition produced by adding a hindered amine compound, an antioxidant, and at least one type of degradation accelerator into a copolymer produced from trioxane and cyclic ether.

21. A resinous composition according to claim 20, wherein the hindered amine compound is expressed by the following formula (D), and the molecular weight of the antioxidant is not less than 400:

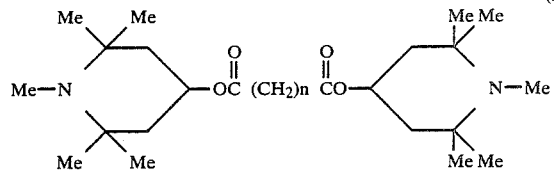
(D)
Wherein n represents an integer in the range from 0 to 20.
22. A resinous composition according to claim 21, wherein at least one of dicyandiamide, melamine, and polyamide is further mixed.
* * * * *
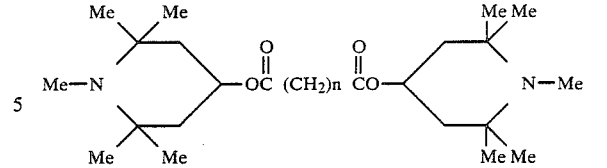
(D)
Wherein n represents an integer in the range from 0 to 20.
22. A resinous composition according to claim 21, wherein at least one of dicyandiamide, melamine, and polyamide is further mixed.
* * * * *

UNITED STATES PATENT AND TRADEMARK OFFICE
CERTIFICATE OF CORRECTION

PATENT NO. : 4,751,272

DATED : 6/14/88

INVENTOR(S) : Sigeru Okita; Yoshiyuki Yamamoto and Toshihiro Hatsu

It is certified that error appears in the above-identified patent and that said Letters Patent is hereby corrected as shown below:

Column 2, line 8, delete "resinuous" and insert --resinous--.

Column 6, delete

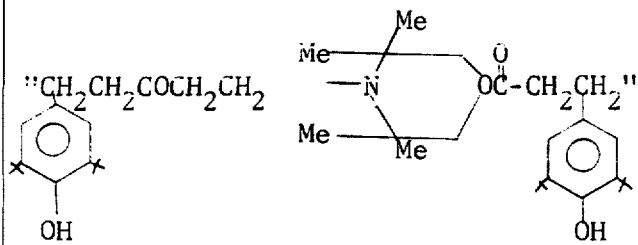

and insert

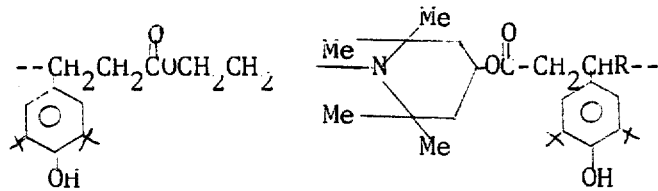

Column 9, line 26, delete "(3,5-di-tert-butyl4-hydroxyphenyl)" and insert (3,5-di-tert-butyl-4-hydroxyphenyl)--.

UNITED STATES PATENT AND TRADEMARK OFFICE
CERTIFICATE OF CORRECTION

PATENT NO. : 4,751,272

DATED : 6/14/88

INVENTOR(S) : Sigeru Okita; Yoshiyuki Yamamoto and Toshihiro Hatsu

It is certified that error appears in the above-identified patent and that said Letters Patent is hereby corrected as shown below:

In column 9, line 66, delete "N,N,N,N-tetramethyladipamide" and insert --N,N,N',N'-tetramethyladipamid--.

Column 10, line 18, delete "N,N- diphenylmelamine" and insert --N,N'-diphenylmelamine".

Column 10, line 19, delete "N,N,N-triphenylmelamine" and insert --N,N',N"-triphenylmelamine--.

In column 10, lines 19-20, delete "N,N-dimethylolmelamine, N,N,N-trimethyl-lolmelamine" and insert --N,N'-dimethylolmelamine,N,N',N"-trimethylol-melamine--.

Column 10, line 23, delete "N,N-diphenylurea" and insert --N,N'-diphenylurea--.

Column 10, line 24, delete "N,N-diphenylthiourea" and insert --N,N'-diphenyl-thiourea--.

Columns 13 and 14, under Table 2, delete "Izod Impact Value: with $\frac{1}{2}$ knotches;" and insert --Izod Impact Value: with a knotch--.

Columns 13 and 14, under Table 1, delete "Izod Impact Value: with $\frac{1}{2}$ knotches;" and insert --Izod Impact Value: with a knotch;--.

Column 14, line 31, delete "(3-tert-butyl-5-methyl4-hydroxyphenyl)" and insert --(3-tert-butyl-5-methyl-4-hydroxyphenyl)--.

Columns 15 and 16, under Table 3, delete "Izod Impact Value: with $\frac{1}{2}$ knotches;" and insert --Izod Impact Value; with a knotch;--.

UNITED STATES PATENT AND TRADEMARK OFFICE
CERTIFICATE OF CORRECTION

PATENT NO. : 4,751,272

DATED : 6/14/88

INVENTOR(S) : Sigeru Okita; Yoshiyuki Yamamoto and Toshihiro Hatsu

It is certified that error appears in the above-identified patent and that said Letters Patent is hereby corrected as shown below:

Column 15 and 16, under Table 4, delete "Melamine" and insert --melamine--.

Columns 15 and 16, under Table 4, delete "Izod Impact Value: with $\frac{1}{2}$ knotches;" and insert --Izod Impact Value: with a knotch;--.

Signed and Sealed this

Twenty-eighth Day of March, 1989

Attest:

DONALD J. QUIGG

*Attesting Officer*  *Commissioner of Patents and Trademarks*